Figure 3:
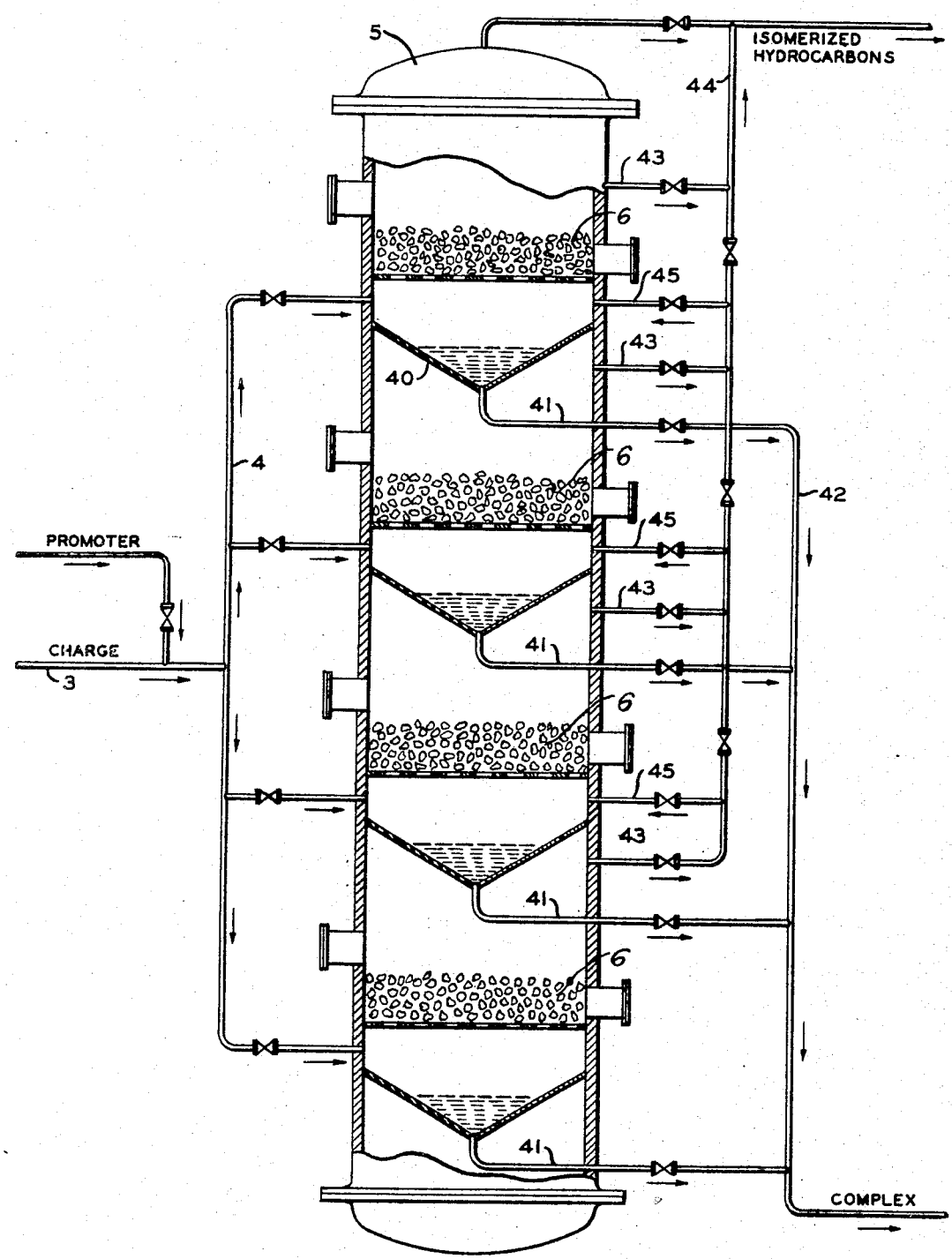

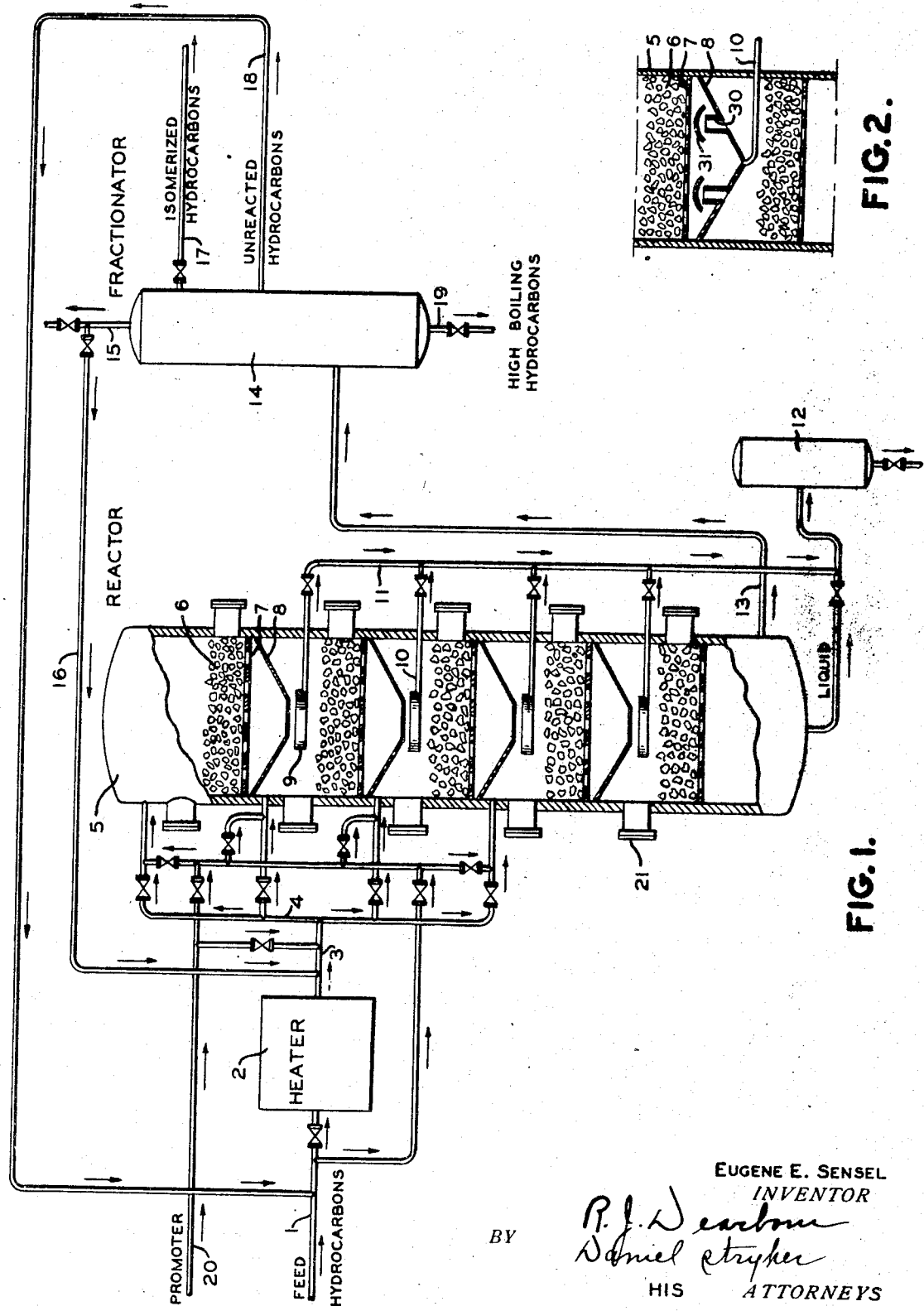

Patented Dec. 21, 1943

2,337,419

UNITED STATES PATENT OFFICE 2,337,419

CATALYTIC CONVERSION OF HYDROCARBONS

Eugene E. Sensel, Beacon, N. Y., assignor to The Texas Company, New York, N. Y., a corporation of Delaware Application January 6, 1942, Serial No. 425,735

4 Claims. (Cl. 260—683.5)

This invention relates to the conversion of hydrocarbons and has to do with the catalytic conversion of hydrocarbons to produce gasoline hydrocarbons of improved octane rating. It is applicable to the isomerization of hydrocarbons and particularly low boiling hydrocarbons to form highly branched hydrocarbons.

The invention broadly contemplates a method of and apparatus for effecting conversion of hydrocarbons by contact with a solid conversion catalyst maintained under conversion conditions such that substantial hydrocarbon conversion is secured, and provision is made for continuously removing heavy liquid reaction products from the solid catalyst substantially as rapidly as formed and thereby materially reduce catalyst deterioration.

More specifically the invention contemplates a method of and apparatus for effecting isomerization of paraffin and naphthene hydrocarbons wherein the hydrocarbons are subjected to contact with a solid isomerization catalyst and provision is made for continuously removing from the catalyst mass liquid products of reaction substantially as rapidly as formed.

According to one modification, the invention involves passing a stream of feed hydrocarbon in the vapor phase through a series of relatively shallow beds of solid catalyst in succession, the catalyst being maintained under conversion conditions such that substantial conversion to isoparaffin is secured. Provision is made for continuously withdrawing liquid material which accumulates in each bed.

In accordance with the invention a metallic halide catalyst such as aluminum chloride in lump or other fragmentary form is disposed in a plurality of shallow beds supported one above the other within a reaction tower. Each bed is spaced substantially apart and traps are provided in the spaces between succeeding beds, the traps being adapted to collect and continuously (or intermittently) discharge liquid drip from each catalyst bed. The feed hydrocarbon at the reaction temperature is passed in a continuous stream of vapor through the reaction tower flowing through the succeeding beds in series. The stream of hydrocarbons including isomerized hydrocarbons is withdrawn from the reaction tower after passage through the final catalyst bed in the series. The withdrawn hydrocarbon mixture is advantageously subjected to fractionation to separate low boiling and high boiling constituents and thereby produce a fraction or fractions comprising the isomerized hydrocarbon product. Unreacted hydrocarbons and gaseous material separated from the reaction mixture may be recycled to the reaction tower while high boiling material is advantageously discharged from the system.

Another modification of the invention contemplates a liquid phase operation in which the reacting hydrocarbons are maintained in liquid phase or substantially so, provision being made for segregating liquid complex and heavy hydrocarbon material at successive points within the reaction zone and for discharging the segregated material therefrom.

The invention is of particular advantage with respect to the isomerization of a low boiling hydrocarbon such as normal butane wherein the hydrocarbon is isomerized by contact in the vapor phase with a solid metallic halide catalyst such as aluminum chloride in the presence of a promoter such as hydrogen chloride. The catalyst tends to enter into reaction with hydrocarbons during the conversion with the formation of hydrocarbon-metallic halide complex liquid compounds. The presence of the complex material as well as other heavy hydrocarbon reaction products in the catalyst mass is undesirable since it interferes with the realizing of efficient contact between the solid metallic halide and the hydrocarbons undergoing conversion.

Furthermore, the complex liquid exerts a softening effect upon the solid metallic halide so that individual lumps or particles of the catalyst disintegrate, tending to convert the catalyst into a single solid mass comparatively free from voids, and therefore resistant to the passage of hydrocarbon vapors through it.

Accordingly, an important advantage of the invention resides in providing means for the continuous removal of liquid complex substantially as rapidly as it accumulates within the reaction zone. A further advantage resides in thus effecting removal of other heavy liquid hydrocarbons which may be produced as a result of the conversion treatment. The presence of such liquid hydrocarbons in the catalyst mass is also undesirable since they may undergo cracking during continued contact with the catalyst with the formation of secondary products, thereby increasing the extent of catalyst deterioration.

In order to describe the invention more fully reference will now be made to the accompanying drawings.

Referring to Fig. 1 of the drawings a feed hydrocarbon such as normal butane is conducted from a source not shown through a pipe 1 and passed through a heater 2 wherein it is heated to a temperature in the range about 180 to 240° and preferably about 200 to 220° F.

The heated hydrocarbon is conducted from the heater 2 through a pipe 3 communicating with a charge manifold 4 providing means for introducing the heated feed hydrocarbon to a reaction tower 5 at a plurality of successive points as indicated. As illustrated the tower is arranged for downward flow of hydrocarbon vapor. If desired all of the feed may be introduced to the top of the tower and caused to flow downwardly therethrough, all of the hydrocarbon charge thus being forced to flow through each successive catalyst bed.

The numeral 6 designates a plurality of catalyst beds, comprising aluminum chloride in lump form and these beds are of relatively shallow depth being supported on trays 7. Thus each bed may be about 5 to 6 feet in depth or in the range from about 1 to 10 feet.

The trays 7 are provided with a large number of perforations or ports, through which fluid may flow. Trays of the bubble cap type may be employed.

Funnel shaped baffles 8 are placed in the spaces between each bed, each baffle having a port at its vertex, and adapted to collect liquid drip from the bed immediately above it.

Positioned a short distance below each baffle 8 is a drip pan 9 adapted to receive the liquid flowing through the port in the vertex of the baffle immediately above it. A conduit 10 extends from the bottom of each pan through the wall of the tower and terminates in a discharge pipe 11 exterior of the tower.

Thus, during operation liquid hydrocarbons and complex liquid compounds accumulating on the catalyst lumps drip from the bottom of each bed into the funnel baffles 8 below each bed and from there into the pans 9 from which the liquid material is continuously drained off through the conduits into the discharge pipe 11. This liquid may be conducted from the discharge pipe 11 to a receiving tank 12. The liquid and complex material collecting in the tank 12 may be disposed of in any suitable manner wherein the hydrocarbons and catalyst may be recovered for further disposition.

Although not shown, liquid seals or other means may be provided in the conduits 10 for the purpose of preventing the escape of hydrocarbon vapors through the conduits.

Sufficient space is provided between the funnel baffles 8 and the adjacent pans 9 and the diameter of the ports in the baffles is sufficiently large so as to permit hydrocarbon vapor to pass from a preceding to a succeeding catalyst bed without substantial interference with the flow of liquid downwardly through the baffles.

If desired separate ports or conduits may be provided for the passage of vapors through or around the funnel baffles 8. Thus, as shown in Fig. 2 the ports in the vertices of the baffles 8 may be made integral with the corresponding conduits 10. Risers 30 are provided in each baffle, each riser being surmounted by a suitable cap 31 to prevent liquid dropping downwardly through the riser while permitting flow of vapor either upwardly or downwardly through the riser depending upon the direction of vapor flow through the reaction tower.

Instead of providing risers 30 through the baffles 8 as shown in Fig. 2 ports may be provided in the vertical wall of the tower 5 both below and above each baffle 8, and conduits provided exterior the tower connecting the ports above and below each baffle so as to pass the vapors around each or any baffle.

Returning to Fig. 1, the hydrocarbon vapors after passage through the final catalyst bed, namely, the lowermost bed, shown in the tower of the drawings, are discharged through a pipe 13 leading to a fractionator 14. The hydrocarbons passing to the fractionator 14 will comprise in this instance isobutane, normal butane and a small amount of hydrocarbon material boiling both below and above butane. In addition it will comprise a small amount of promoter, namely, hydrogen chloride.

The fractionator 14 is advantageously such as to permit separation of the reacted hydrocarbon mixture into a plurality of fractions. Thus, a fraction consisting essentially of gaseous constituents including hydrogen chloride promoter may be removed through a pipe 15 and recycled all or in part through a pipe 16 to the reaction tower.

An intermediate fraction consisting essentially of isobutane may be removed as a side stream through a pipe 17 while a fraction consisting essentially of unreacted hydrocarbon, for example, normal butane may be drawn off through pipe 18 and recycled to the reaction zone. Higher molecular weight material may be removed from the fractionator through a pipe 19.

The fraction removed as a side stream through the pipe 17 may comprise isobutane as well as some unreacted normal butane. However, any suitable provision may be made for effecting separation between isomerized hydrocarbons and unreacted hydrocarbons so that the unreacted hydrocarbons such as normal butane may be recycled to the reaction tower.

The catalytic reaction in the reaction tower 5 is promoted with a hydrogen halide such as hydrogen chloride, hydrogen bromide, or with any other suitable promoting or activating substance such as carbon tetrachloride and low molecular weight alkyl chlorides capable of providing hydrogen halide in the reaction. A small amount of promoter substance is advantageously added continuously from a source not shown through a pipe 20. It may be injected into the heated feed hydrocarbon passing through the pipe 3. If desired the promoter may be introduced directly to the reaction tower at a plurality of successive points as indicated.

Reference has already been made to the provision for injection of the feed hydrocarbon at a plurality of successive points. This is advantageous particularly where it is desired to regulate the temperature of the succeeding catalyst beds. In such case a suitable proportion of the cold hydrocarbon feed vapor may be by-passed around the heater 2 and injected directly to the reaction tower at a plurality of intermediate points.

Other means for controlling the temperature of the catalyst bed may be employed as, for example, cooling coils imbedded within the catalyst mass and through which coils a heat exchange medium may be circulated.

Since the catalyst undergoes some deterioration due to complex formation and a resulting complex liquid is continuously removed the quantity of solid catalyst will progressively diminish. Therefore, provision may be made for the continuous introduction of solid catalyst to the reaction tower, such provision may include suitable screw conveyors not shown, and adapted to force the solid catalyst into each bed through manholes or ports 21. Similar conveyors may be employed for continuous withdrawal of partly used catalyst.

While a specific type of trapping means has been described above with which to collect and remove the liquid drip from each catalyst bed, nevertheless it is contemplated that other forms of trapping means may be employed for the purpose of collecting and discharging the liquid substantially as rapidly as it accumulates in the successive stages within the reaction tower.

Fig. 3 of the drawings illustrates a reaction tower provided with a different arrangement for collecting and discharging liquid complex material therefrom.

As in the case of the tower illustrated in Fig. 1 a plurality of beds 6 of isomerization catalyst is provided. In the space between each bed is placed a funnel-shaped baffle 40 having a port at its vertex and adapted to collect liquid drip from the bed immediately above it. The peripheral edge of each baffle makes direct contact with the adjacent inner surface of the wall of the tower so as to provide a fluid-tight contact.

The port in the vertex of each baffle communicates with a discharge pipe 41 extending through the wall of the tower.

The discharge pipes 41 communicate with a common pipe 42 through which the liquid material drawn off from each pan is conducted from the system.

As in the case of the tower in Fig. 1 the charge and promoter may be introduced from a pipe 3 through a charge manifold 4 providing means for introducing the heated feed hydrocarbon to the tower at a plurality of successive points. In each case the point of feed introduction to the tower may be just below each succeeding catalyst bed so as to provide upward flow of feed hydrocarbon through the catalyst masses.

According to one method of operation, parallel flow of feed hydrocarbons through the several catalyst beds may be employed. In such operation the treated hydrocarbons are removed from a point above each catalyst bed. Discharge pipes 43 are provided for this purpose and these pipes communicate with a common pipe 44 through which the treated hydrocarbons are conducted to the fractionator.

When the successive beds are operated with series flow the stream of hydrocarbons issuing from above each bed is conducted through the pipes 43 as before into the pipe 44 but returned through branch pipes 45 providing inlets to the tower at points just below each catalyst bed. In this manner the pipes 43 and 45 provide means for conducting the upflowing hydrocarbons around each baffle 40.

Suitable valves as indicated may be provided in the pipe 44 and the pipes 43 and 45 for the purpose of controlling the flow of fluid therethrough.

With the valve means thus provided it is also possible to bypass one or more of the catalyst beds.

The reaction tower illustrated in Fig. 3 also lends itself to the possibility of operating in the liquid phase. The pans 40 may be positioned so as to permit sufficient settling space within which to effect stratification between liquid reacting hydrocarbons and liquid complex material. Floats or other indicating means may be provided in each settling space with which to control the interface level within each settling space. Also with liquid phase operation, either upward or downward flow of feed hydrocarbons may be employed.

While a single reaction tower has been described it is also contemplated that a plurality of reaction towers may be employed. Moreover, it is also contemplated that a system may be used involving a plurality of individual reaction vessels each containing an individual and relatively shallow bed of catalyst, provision being made for trapping out liquid accumulating in the bottom of each stage or vessel, the vapors substantially free from liquid passing into a succeeding stage.

Mention has been made of employing the invention in the isomerization of normal butane. However, it is contemplated that the invention may be employed for effecting isomerization of other hydrocarbons such as gasoline and naphtha hydrocarbons or fractions thereof.

It is also contemplated that the isomerization reaction may be carried out in the presence of an agent adapted to inhibit or substantially reduce cracking or other side reactions which otherwise tend to occur when subjecting feed hydrocarbons to contact with an isomerization catalyst. Such agents may include gaseous agents such as carbon monoxide, hydrogen and hydrogen-containing gases such as methane, ethane, etc. Normally liquid agents may be employed such as naphthene hydrocarbons. Also mixtures of gaseous and liquid agents may be employed with provision for separating such agents from the products removed from the reaction zone and recycling them thereto.

In carrying out the isomerization reaction provision may be made for removing olefinic and aromatic hydrocarbons, sulfur compounds and other impurities which tend to poison a metallic halide isomerization catalyst.

While aluminum chloride has been specifically mentioned as an isomerization catalyst it is intended that other metallic halide catalysts may be employed such as ferric chloride, zirconium chloride and metallic mixed halides such as $AlCl_2F$, $AlF_2Cl$, etc.

The apparatus disclosed is advantageous from the standpoint of facilitating washing of the solid catalyst in situ with a suitable wash solvent adapted to remove complex and heavy liquid material adhering to the catalyst. For example, the catalyst mass may be washed periodically with solvent such as tetrachloroethane, chlorobenzene, orthodichlorobenzene and methylene dichloride.

Obviously many modifications and variations of the invention as above set forth may be made without departing from the spirit and scope thereof, and therefore, only such limitations should be imposed as are indicated by the appended claims.

I claim:

1. A method of isomerizing hydrocarbons by contact with a solid metallic halide isomerization catalyst which comprises disposing a plurality of shallow porous beds of solid metallic halide within a reaction tower, each bed being spaced vertically apart, with a partition between beds to provide substantial settling space below each bed, maintaining said catalyst beds under conditions such that isomerization constitutes the principal reaction, continuously passing feed hydrocarbon in liquid phase through the beds in series flow such that feed hydrocarbons are isomerized, the conversion being accompanied by formation of liquid comprising metallic halide-hydrocarbon complex, maintaining a body of hydrocarbons and said complex in each settling space, effecting stratification of liquid therein to form a hydrocarbon phase and a complex phase, withdrawing the separated complex from the reaction tower, the hydrocarbon phase remaining for further contact with the catalyst, passing reacted and unreacted hydrocarbons from a preceding stage to a succeeding stage, and continuously removing isomerized hydrocarbons after passage from the final bed.

2. A method of isomerizing hydrocarbons by contact with solid metallic halide isomerization catalyst which comprises disposing a plurality of shallow porous beds of solid aluminum chloride within a reaction tower, each bed being spaced vertically apart, with a partition between beds to provide substantial settling space below each bed, maintaining said catalyst beds under conditions such that isomerization constitutes the principal reaction, continuously passing feed hydrocarbon in liquid phase through the beds in series flow in the presence of hydrogen halide such that feed hydrocarbons are isomerized, the conversion being accompanied by formation of liquid comprising metallic halide-hydrocarbon complex, maintaining a body of hydrocarbons and said complex in each settling space, effecting startification of liquid therein to form a hydrocarbon phase and a complex phase, withdrawing the separated complex from the reaction tower, the hydrocarbon phase remaining for further contact with the catalyst, passing reacted and unreacted hydrocarbons from a preceding stage to a succeeding stage, and continuously removing isomerized hydrocarbons after passage from the final bed.

3. The method according to claim 2 in which the feed hydrocarbon consists essentially of normal butane and the isomerization reaction is effected at a temperature in the range about 200 to 220° F.

4. A method of isomerizing hydrocarbons by contact with a solid metallic halide isomerization catalyst which comprises disposing a plurality of shallow porous beds of solid metallic halide within a reaction tower, each bed being spaced vertically apart, with a partition between beds to provide substantial settling space below each bed, maintaining said catalyst beds under conditions such that isomerization constitutes the principal reaction, continuously introducing feed hydrocarbons in liquid phase to said tower, maintaining a body of liquid hydrocarbons undergoing treatment moving upwardly through each catalyst bed in series, said hydrocarbons undergoing isomerization during contact with the catalyst, said conversion being accompanied by formation of liquid comprising metallic halide-hydrocarbon complex, effecting stratification of liquid in the settling space below each bed to form a hydrocarbon phase and a complex phase, withdrawing said complex phase from the reaction tower, the hydrocarbon phase remaining as a component of said body of hydrocarbons rising through the catalyst beds, conducting hydrocarbon liquid after passage through a preceding bed to the space below the succeeding bed, and removing isomerized hydrocarbons after passage from the final bed.

EUGENE E. SENSEL.